(12) United States Patent
Sundberg et al.

(10) Patent No.: US 11,329,858 B2
(45) Date of Patent: May 10, 2022

(54) QUARDRATURE PHASE-SHIFTING KEYING RECEPTION FOR NON-EQUIPROBABLE BIT RECEPTION

(71) Applicant: Telefonaktiebolaget LM Ericsson (publ), Stockholm (SE)

(72) Inventors: Mårten Sundberg, Årsta (SE); Kittipong Kittichokechai, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/967,581

(22) PCT Filed: Feb. 15, 2019

(86) PCT No.: PCT/IB2019/051260
§ 371 (c)(1),
(2) Date: Aug. 5, 2020

(87) PCT Pub. No.: WO2019/159137
PCT Pub. Date: Aug. 22, 2019

(65) Prior Publication Data
US 2021/0320834 A1  Oct. 14, 2021

Related U.S. Application Data

(60) Provisional application No. 62/710,393, filed on Feb. 16, 2018.

(51) Int. Cl.
*H04L 27/34* (2006.01)
*H04L 1/18* (2006.01)
(Continued)

(52) U.S. Cl.
CPC ........ *H04L 27/3405* (2013.01); *H04L 1/1812* (2013.01); *H04L 1/1861* (2013.01); *H04L 5/0055* (2013.01); *H04L 2001/125* (2013.01)

(58) Field of Classification Search
CPC .... H04L 1/1812; H04L 1/1896; H04L 1/1864
See application file for complete search history.

(56) References Cited

U.S. PATENT DOCUMENTS

2009/0219897 A1   9/2009  Pajukoski et al.
2017/0346605 A1*  11/2017 Chendamarai Kannan .................
                                                          H04L 1/1874
2020/0092037 A1*  3/2020  Wang .................... H04L 1/1861

FOREIGN PATENT DOCUMENTS

EP           2618515 A2      7/2013

OTHER PUBLICATIONS

PCT International Search Report and Written Opinion dated Jun. 11, 2019 for International Application PCT/IB2019/051260, 11 pages.
(Continued)

*Primary Examiner* — Kevin Kim
(74) *Attorney, Agent, or Firm* — Sage Patent Group

(57) ABSTRACT

A method is performed by a wireless device for transmitting Hybrid Automatic Repeat Request (HARQ) feedback. The wireless device, for an uplink transmission to be transmitted on an uplink channel, applies a modified modulation constellation for a HARQ feedback. The modified modulation constellation has a modified Acknowledgment/Non-Acknowledgment (ACK/NACK) assignment as compared to a normal modulation constellation having a normal ACK/NACK assignment. The wireless device further transmits HARQ feedback in the uplink transmission according to the modified modulation constellation.

19 Claims, 11 Drawing Sheets

(51) Int. Cl.
H04L 5/00 (2006.01)
H04L 1/12 (2006.01)

(56)  References Cited

OTHER PUBLICATIONS

Huawei et al., 3GPP TSG RAN WG1 Ad Hoc Meeting, R1-1800054, "Discussion on UCI Feedback for URLLC", Vancouver, Canada, Jan. 22-26, 2018, 14 pages.
Ericsson, 3GPP TSG-RAN WG1 Meeting 92b, R1-1805168, "On PUCCH/SPUCCH Reliability for URLLC", Sanya, China, Apr. 16-20, 2018, 6 pages.

* cited by examiner

QUARDRATURE PHASE-SHIFTING KEYING RECEPTION FOR NON-EQUIPROBABLE BIT RECEPTION

CROSS-REFERENCE TO RELATED APPLICATIONS

This application is a 35 U.S.C. § 371 national stage application for International Application No. PCT/IB 2019/051260, entitled "IMPROVED QUARDRATURE PHASE-SHIFTING KEYING RECEPTION FOR NON-EQUIPROBABLE BIT RECEPTION", filed on Feb. 15, 2019, the disclosures and contents of which are hereby incorporated by reference in their entireties. Further, the present application claims the benefit of and priority to U.S. Provisional Patent Application No. 62/710,393, filed on Feb. 16, 2018, entitled "IMPROVED QPSK RECEPTION FOR NON-EQUIPROBABLE BIT RECEPTION", the disclosure of which is hereby incorporated herein by reference in its entirety.

TECHNICAL FIELD

Certain embodiments of the present disclosure relate, in general, to wireless communications and, more particularly, to transmitting hybrid automatic repeat request (HARQ) feedback.

BACKGROUND

LTE uses Orthogonal Frequency Division Multiplexing (OFDM) in the downlink (DL) and Discrete Fourier Transform (DFT)-spread OFDM in the uplink (UL). In the time domain, LTE downlink transmissions are organized into radio frames of 10 ms, each radio frame consisting of ten equally-sized subframes of length Tsubframe=1 ms, as shown in the example in FIG. 1.

Furthermore, the resource allocation in LTE is typically described in terms of resource blocks (RB), where a resource block corresponds to one slot (0.5 ms) in the time domain and 12 contiguous subcarriers in the frequency domain A pair of two adjacent resource blocks in time direction (1.0 ms) is known as a resource block pair. This is also denoted as TTI (Transmission Time Index).

Downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI) indicated by the physical CFI channel (PCFICH) transmitted in the first symbol of the control region. The control region also contains physical downlink control channels (PDCCH) and possibly also physical HARQ indication channels (PHICH) carrying ACK/NACK for the uplink transmission.

The downlink subframe also contains common reference symbols (CRS), which are known to the receiver and used for coherent demodulation of e.g. the control information. FIG. 2 illustrates a downlink system with CFI=3 OFDM symbols as control. In a Rel-8 TTI, one such portion of the DL transmission is termed as one TTI.

In uplink (UL), the data channel is sent via physical uplink shared channel (PUSCH) as well as the (short) physical uplink control channel (sPUCCH).

Downlink (DL) and UL transmission can also be carried out when configured to operate with the short TTI feature. The feature introduces two new basic transmission durations over the air interface (in addition to 1 ms duration), either of slot length or of subslot length.

A slot is defined by 7 OFDM symbols duration (defined as one LTE Rel-8 slot), while, A subslot is defined by either 2 OFDM symbols or 3 OFDM symbols duration. The reason to have varying length of the subslot across the subframe is the split of a subframe in 14 symbols, and the design principle that a subslot is not to cross a slot boundary (leaving a slot of 7 symbols to be split into an integer number of subslots)

Due to the physical downlink control channel (PDCCH) region in the beginning of the first slot, the second slot will have more resources available for data.

The DL subslot pattern is dependent on the first symbol in the DL allowed to map physical downlink shared channel (PDSCH) to, while the UL subslot pattern is fixed, as shown in FIG. 3. The subslot number per subframe is denoted 0 to 5. In some DL subframes there might only be 5 subslots available for data transmission (in which case the subslot number is defined from 1 to 5).

Physical Uplink Control Channel (PUCCH)

PUCCH resources carry uplink control information (UCI) that includes scheduling requests (SR), hybrid-ARQ acknowledgements and channel state information (CSI reports). There exist different PUCCH formats. Also, a short PUCCH (or SPUCCH or sPUCCH) is defined in the LTE standard with various formats for different payload sizes carried.

Certain embodiments disclosed herein discuss applications and/or enhancements of the short PUCCH format, such as sPUCCH formats 1/1a/1b.

PUCCH format 1, 1a and 1b may carry scheduling requests (SR) and one or two HARQ ACK/NACKs, respectively. Multiplexing of SR with HARQ feedback is also possible.

For PUCCH formats 1a and 1b, one or two bits are transmitted. First, the bit(s) are converted to a complex valued number d(0) according to Table 1. The complex valued number d(0) is then spread over 12 carriers using cyclically shifted length 12 sequence, which is a function of angle phi in Table 2 and where the cyclic shift is antenna port specific. The set of 12 complex numbers correspond to one Orthogonal frequency-division multiplexing (OFDM) symbol of 12 subcarriers.

In one slot of PUCCH format 1 resources, a demodulation reference signal (DMRS) exists on three OFDM symbols leaving four OFDM symbols for information transmission (three in case of extended cyclic prefix (CP)). The 12 complex numbers are then further spread over the four OFDM symbols using orthogonal spreading codes from Table 3. This set is then mapped onto both slots.

TABLE 1

Modulation symbol $d(0)$ for PUCCH formats 1a and 1b

| PUCCH format | $b(0), \ldots, b(M_{bit} - 1)$ | $d(0)$ |
| --- | --- | --- |
| 1a | 0 | 1 |
|    | 1 | −1 |
| 1b | 00 | 1 |
|    | 01 | −j |
|    | 10 | j |
|    | 11 | −1 |

TABLE 2

Definition of $\varphi^{(n)}$ for $M_{sc}^{RS} = N_{sc}^{RB}$

| u | $\varphi(0), \ldots, \varphi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

TABLE 3

Orthogonal sequences $[w(0) \ldots w(N_{SF}^{PUCCH} - 1)]$ for $N_{SF}^{PUCCH} = 4$

| Sequence index $n_{oc}(\tilde{p})(n_s)$ | Orthogonal sequences $[w(0) \ldots w(N_{SF}^{PUCCH} - 1)]$ |
|---|---|
| 0 | [+1 +1 +1 +1] |
| 1 | [+1 -1 +1 -1] |
| 2 | [+1 -1 -1 +1] |

The performance requirements on PUCCH format 1/1a/1b are defined based on how often a transmitted state is changed at reception. Three different states are defined: Ack, Nack, and DTX. DTX is defined as nothing being transmitted (from a transmitter point of view), or that the receiver estimates that nothing was transmitted (from a receiver point of view). If, for example, an (transmitted) Ack changes to a (received) Nack, it is referred to A2N. The requirements are:

Ack error rate (A2N+A2D): less than $10^{-2}$
D2A: less than $10^{-2}$
N2A: less than $10^{-3}$ Short Physical Uplink Control Channel (sPUCCH)

The sPUCCH is similar to PUCCH in its usage (i.e., it may carry HARQ and SR on UL). However, the sPUCCH is configured based on the transmission duration of a slot or subslot length (instead of subframe length, as for PUCCH).

sPUCCH format 1/1a/1b for subslot transmission is based on assigning different sequences, or DMRS sequences (using the same terminology of PUCCH) for each Ack/Nack state.

sPUCCH format 1/1a/1b for slot transmission is similar to PUCCH. It uses symbols that are either a DMRS sequence, or the same sequence modulated with a phase, representing the bit(s) transmitted. FIG. 4 illustrates example slot-sPUCCH transmissions according to various configurations.

HARQ ACK/NACK Reporting

In case of slot or subslot transmission, the reporting of the decoding state of the downlink transmission is reported based on all configured carriers for both the configured slot/subslot. Additionally, the decoding state of the downlink transmission is also reported for the subframe transmission. This is motivated by allowing the network to fall back to a subframe-based transmission even if slot or subslot transmissions are configured.

As a result, the wireless device may be requested or required to report HARQ-ACK for both subslot/slot and subframe in the same SPUCCH, e.g., if the feedback timing collides on the UL.

In case of semi-static, or also called fixed, codebook size for the HARQ-ACK, all configured carriers for subslot/slot are reported as well as the subframe feedback, even if no fall back to subframe transmission duration has happened.

These reporting requirements may present certain challenges. For example, the fall back to subframe duration is typically rare, and for services that map to an Ultra-Reliable Low Latency Communications (URLLC) use case, it might never happen (e.g., if the latency bound does not allow subframe operation). Thus, the bit representing subframe feedback may always be set to Nack (or any the state the UE sets the feedback to if no DL assignment has been detected). As a result, a receiver of the feedback may only detect two states of the four-point constellation, instead of four constellation points that are equi-probable, e.g., distributed equally about the constellation space.

As an example, FIG. 5 depicts a full QPSK constellation on the left and an example experienced constellation by the receiver on the right. Comparing the left side of the figure with all states used on the right figure, if the first bit is used for subframe feedback, the UE may never set the first bit to Ack (here represented as "1"). As a result, the constellation is effectively reduced to a two-state constellation from a receiver point of view. More specifically, and as shown on the right side of FIG. 5, for example, the receiver may detect only the white constellation points depicted as 00 and 01. Thus, the darker constellation points depicted as 10 and 11 may not be detected.

The experienced constellation from the receiver point of view may not be optimum. For example, decoding performance may be reduced because the two "visible" constellation points are not placed at optimum distance from each other. As used herein, this may be referred to as a "skewed BPSK" (skewed Binary Phase Shift Keying) constellation.

Certain aspects of the present disclosure and their embodiments may provide solutions to these or other challenges.

SUMMARY

According to an embodiment, a method is performed by a wireless device for transmitting Hybrid Automatic Repeat Request (HARQ) feedback. The method comprises, for an uplink transmission to be transmitted on an uplink channel, applying a modified modulation constellation for a HARQ feedback. The modified modulation constellation has a modified Acknowledgment/Non-Acknowledgment (ACK/NACK) assignment as compared to a normal modulation constellation having a normal ACK/NACK assignment. The method further comprises transmitting HARQ feedback in the uplink transmission according to the modified modulation constellation.

According to another embodiment, a wireless device comprises a memory configured to store instructions and processing circuitry configured to execute the instructions. The wireless device is configured to, for an uplink transmission to be transmitted on an uplink channel, apply a modified modulation constellation for a Hybrid Automatic Repeat Request (HARQ) feedback. The modified modulation constellation has a modified Acknowledgment/Non-Acknowledgment (ACK/NACK) assignment as compared to a normal modulation constellation having a normal ACK/NACK assignment. The wireless device is further configured to transmit HARQ feedback in the uplink transmission according to the modified modulation constellation.

According to yet another embodiment, a computer program product includes comprises a non-transitory computer readable medium storing computer readable program code. The computer readable program code comprises program code for, for an uplink transmission to be transmitted on an uplink channel, applying a modified modulation constellation for a Hybrid Automatic Repeat Request (HARQ) feedback. The modified modulation constellation has a modified Acknowledgment/Non-Acknowledgment (ACK/NACK) assignment as compared to a normal modulation constellation having a normal ACK/NACK assignment. The computer readable program code further comprises program code for transmitting HARQ feedback in the uplink transmission according to the modified modulation constellation.

In certain embodiments, the method, wireless device, and/or computer program product may have one or more additional features:

In particular embodiments, the normal modulation constellation comprises a plurality of constellation points and the modified modulation constellation comprises the plurality of constellation points having a respective position of at least two of the constellation points swapped as compared to a respective position of the same at least two constellation points in the normal modulation constellation.

In particular embodiments, the normal modulation constellation comprises a plurality of constellation points and the modified modulation constellation comprises the plurality of constellation points having a respective ACK/NACK state of at least two of the constellation points swapped as compared to a respective ACK/NACK state of the same at least two constellation points in the normal modulation constellation.

In particular embodiments, the method/wireless device/computer program product further comprises/is configured to/comprises program code for configuring the wireless device to use the modified ACK/NACK assignment when transmitting HARQ feedbacks in uplink transmissions on a plurality of physical channels.

In particular embodiments, the method/wireless device/computer program product further comprises/is configured to/comprises program code for configuring the wireless device to use the modified ACK/NACK assignment when transmitting HARQ feedbacks for uplink transmissions on slot-based short physical uplink control channel (sPUCCH).

In particular embodiments, the method/wireless device/computer program product further comprises/is configured to/comprises program code for receiving, from a network node, an indication that the wireless device is to apply the modified ACK/NACK assignment.

In particular embodiments, the indication is received via radio resource control (RRC) signalling.

In particular embodiments, the method/wireless device/computer program product further comprises/is configured to/comprises program code for determining to apply the modified ACK/NACK assignment if the wireless device is configured to use a small or compact downlink control information (DCI) size.

In particular embodiments, the method/wireless device/computer program product further comprises/is configured to/comprises program code for determining to apply the modified ACK/NACK assignment if the wireless device is configured with a service having non-equiprobable transmission of different state using the normal ACK/NACK assignment.

In particular embodiments, the method/wireless device/computer program product further comprises/is configured to/comprises program code for determining an operation mode of the wireless device based on whether subframe feedback is reported. The method/wireless device/computer program product further comprises/is configured to/comprises program code for, based on the determined operational mode, determining to apply the modified ACK/NACK assignment if subframe feedback is not reported. In some embodiments, when in the determined operation mode, the wireless device is configured to use a small or compact downlink control information (DCI) size. In some embodiments, when in the determined operation mode, the wireless device is configured with a service having non-equiprobable transmission of different state using the normal ACK/NACK assignment.

In particular embodiments, the uplink channel is a short physical uplink control channel (sPUCCH).

According to an embodiment, a method is performed by a network node for receiving Hybrid Automatic Repeat Request (HARQ) feedback. The method comprises transmitting, to a wireless device, an indication to apply a modified modulation constellation. The modified modulation constellation has a modified Acknowledgment/Non-Acknowledgment (ACK/NACK) assignment as compared to a normal modulation constellation having a normal ACK/NACK assignment. The method further includes receiving HARQ feedback in an uplink transmission from the wireless device on an uplink channel according to the modified modulation constellation.

According to another embodiment, a network node comprises a memory configured to store instructions and processing circuitry configured to execute the instructions. The network node is configured to transmit, to a wireless device, an indication to apply a modified modulation constellation. The modified modulation constellation has a modified Acknowledgment/Non-Acknowledgment (ACK/NACK) assignment as compared to a normal modulation constellation having a normal ACK/NACK assignment. The network node is further configured to receive Hybrid Automatic Repeat Request (HARQ) feedback in an uplink transmission from the wireless device on an uplink channel according to the modified modulation constellation.

According to yet another embodiment, a computer program product includes comprises a non-transitory computer readable medium storing computer readable program code. The computer readable program code comprises program code for, transmitting, to a wireless device, an indication to apply a modified modulation constellation. The modified modulation constellation has a modified Acknowledgment/Non-Acknowledgment (ACK/NACK) assignment as compared to a normal modulation constellation having a normal ACK/NACK assignment. The computer readable program code further comprises program code for receiving Hybrid Automatic Repeat Request (HARQ) feedback in an uplink transmission from the wireless device on an uplink channel according to the modified modulation constellation.

In certain embodiments, the method, network node, and/or computer program product may have one or more additional features:

In particular embodiments, the normal modulation constellation comprises a plurality of constellation points and the modified modulation constellation comprises the plurality of constellation points having a respective position of at least two of the constellation points swapped as compared to a respective position of the same at least two constellation points in the normal modulation constellation.

In particular embodiments, the normal modulation constellation comprises a plurality of constellation points and the modified modulation constellation comprises the plurality of constellation points having a respective ACK/NACK state of at least two of the constellation points swapped as compared to a respective ACK/NACK state of the same at least two constellation points in the normal modulation constellation.

In particular embodiments, the method/network node/computer program product further comprises/is configured to/comprises program code for configuring the wireless device to use the modified ACK/NACK assignment when transmitting HARQ feedbacks in uplink transmissions on a plurality of physical channels.

In particular embodiments, the method/network node/computer program product further comprises/is configured to/comprises program code for configuring the wireless device to use the modified ACK/NACK assignment when transmitting HARQ feedbacks in uplink transmissions on slot-based short physical uplink control channel (sPUCCH).

In particular embodiments, the indication is transmitted via RRC signalling.

In particular embodiments, the method/network node/computer program product further comprises/is configured to/comprises program code for transmitting the indication to the wireless device to apply the modified ACK/NACK assignment if the wireless device is configured to use a small or compact downlink control information (DCI) size.

In particular embodiments, the method/network node/computer program product further comprises/is configured to/comprises program code for transmitting the indication to the wireless device to apply the modified ACK/NACK assignment if the wireless device is configured with a service having non-equiprobable transmission of different state using the normal ACK/NACK assignment.

In particular embodiments, the uplink channel is a short physical uplink control channel (sPUCCH).

Certain embodiments of the present disclosure may provide one or more technical advantages. For example, certain embodiments enhance the performance of HARQ feedback in uplink transmissions through the use of a modified modulation constellation. The modified constellation may have a better constellation point distribution as viewed at the receiver side, which may reduce the error rate and enhance the reception/signal strength of HARQ feedback. As another example, a modulation constellation may be modified by swapping ACK/NACK assignments between two symbols. By swapping assignments, the resulting received constellation may be balanced or not skewed, if one bit is always "on" or "off," e.g., if subframe ACK/NACK reporting is turned off. As yet another example, the performance of the slot-based short physical uplink channel (sPUCCH) is improved.

Certain embodiments may have none, some, or all of the above-recited advantages. Other advantages may be readily apparent to one having skill in the art.

BRIEF DESCRIPTION OF THE DRAWINGS

For a more complete understanding of the disclosed embodiments and their features and advantages, reference is now made to the following description, taking in conjunction with the accompanying drawings, in which.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 6:
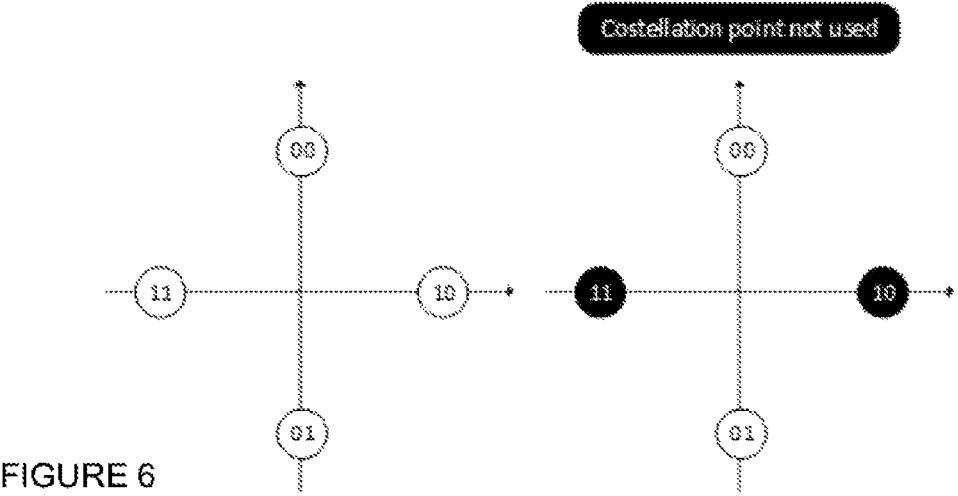
FIG. 6 illustrates an example modified full QPSK constellation with swapped constellation points and the example constellation experienced at a receiver, in accordance with certain embodiments.

As discussed above, a four-point constellation may be effectively reduced to a skewed binary constellation from the receiver's point of view, which may degrade the decoding performance According to certain embodiments, two or more constellation points may be swapped in the constellation to achieve the optimum constellation as experienced with the receiver. FIG. 6 illustrates an example constellation where two constellation points are swapped to achieve the optimum constellation as experienced by the receiver.

Figure 1:
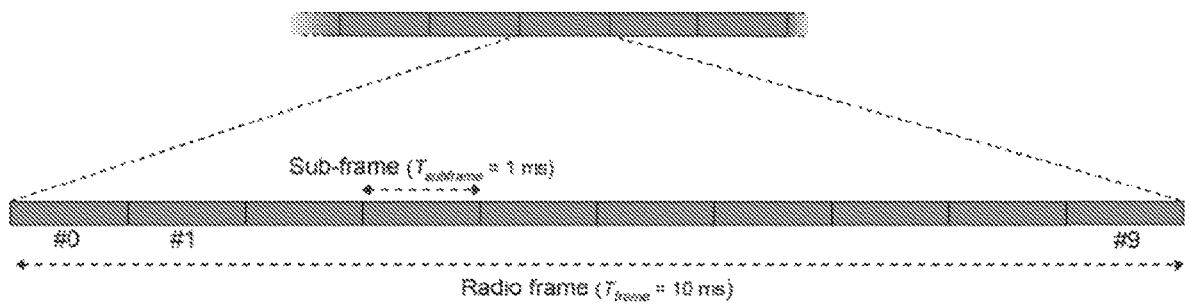
FIG. 1 illustrates an example time-domain structure for an LTE system architecture, in accordance with certain embodiments.
Figure 2:
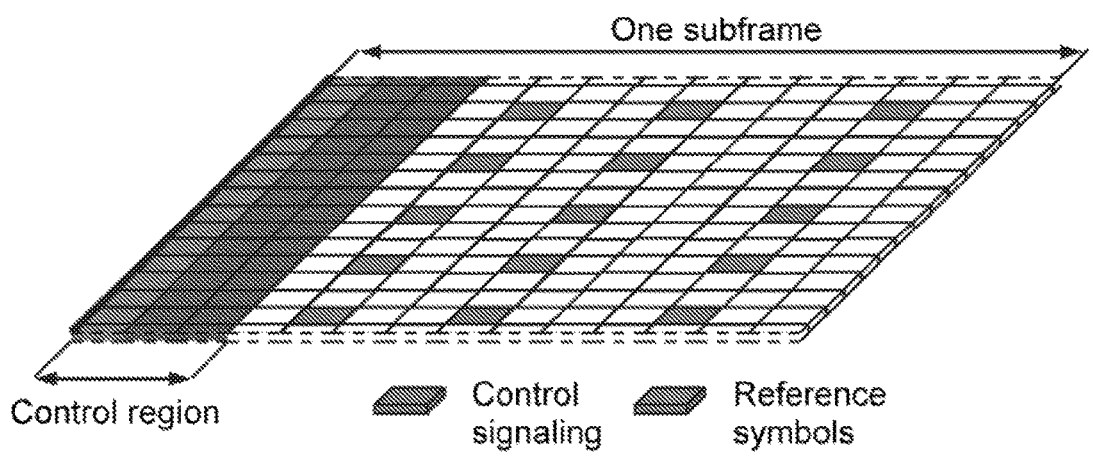
FIG. 2 illustrates an example structure of a downlink subframe, in accordance with certain embodiments.
Figure 3:
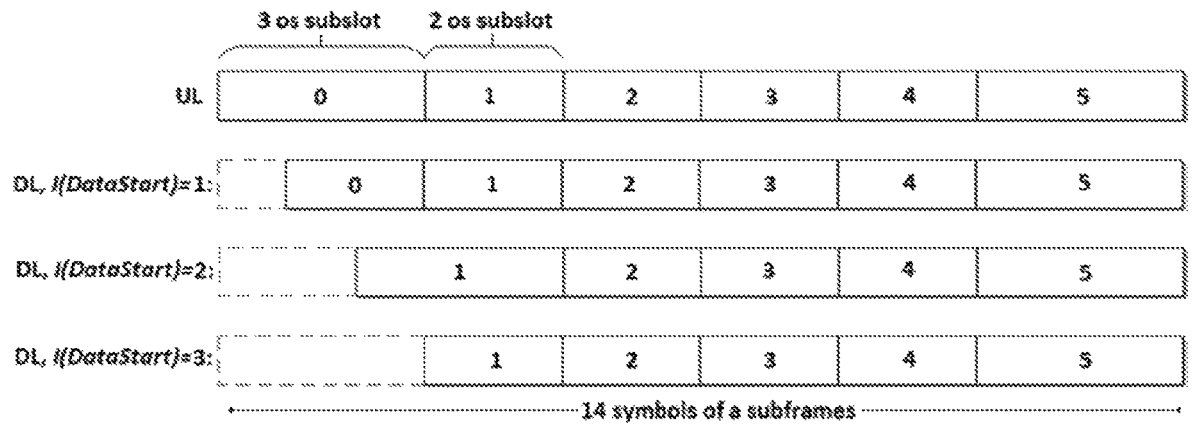
FIG. 3 illustrates an example subslot layout for a subframe, in accordance with certain embodiments.
Figure 4:
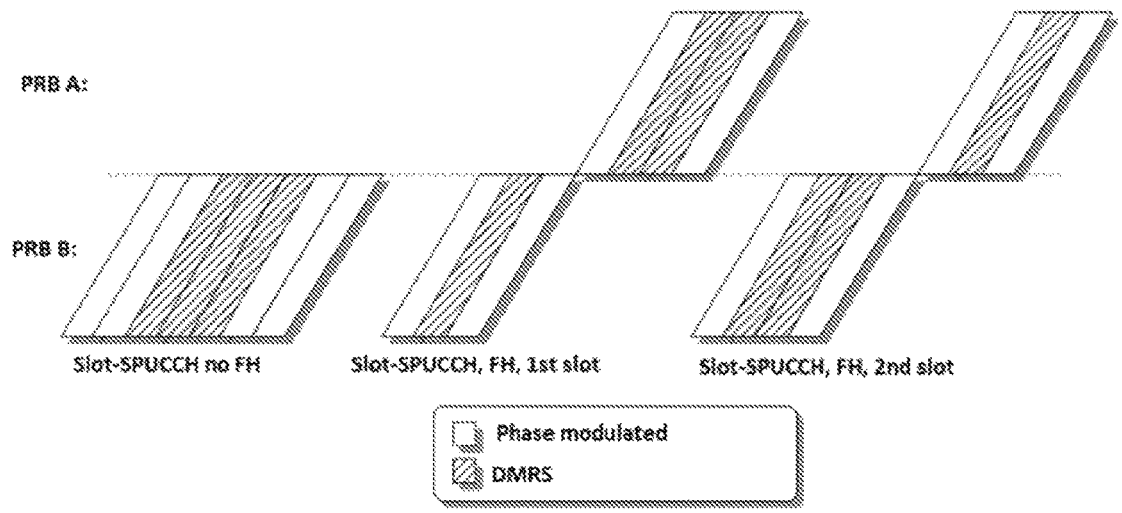
FIG. 4 illustrates an example short physical uplink control channel (sPUCCH) layout, in accordance with certain embodiments.
Figure 5:
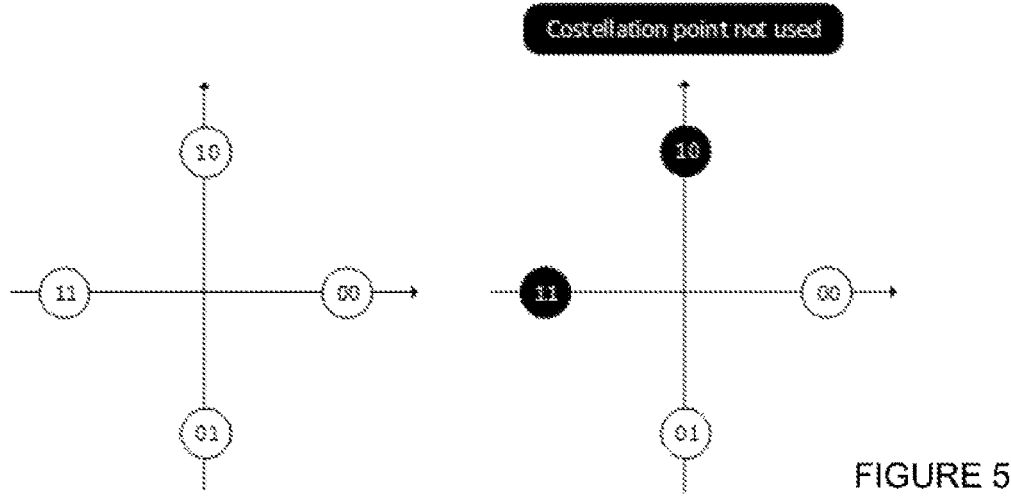
FIG. 5 illustrates an example full quadrature phase-shifting keying (QPSK) constellation and the example constellation experienced at a receiver, in accordance with certain embodiments.

Specifically, as compared to FIG. 5, the constellation points depicted as 00 and the 10 have been swapped such that the detected constellation points depicted as 00 and 01 are as far apart from one another as possible. Put another way, the points 00 and 01 are spaced equally apart from one another resulting in an unskewed or balanced binary constellation, as viewed by the receiver.

The change to the existing specifications or "normal" configuration for the constellation (described above in Table 1) is shown below in Table 4:

TABLE 4

Modified modulation constellation in the specifications

| PUCCH format | $b(0), \ldots, b(M_{bit} - 1)$ | $d(0)$ |
|---|---|---|
| 1b | ~~00~~ 10 | 1 |
|  | 01 | −j |
|  | ~~10~~ 00 | j |
|  | 11 | −1 |

Figure 7:
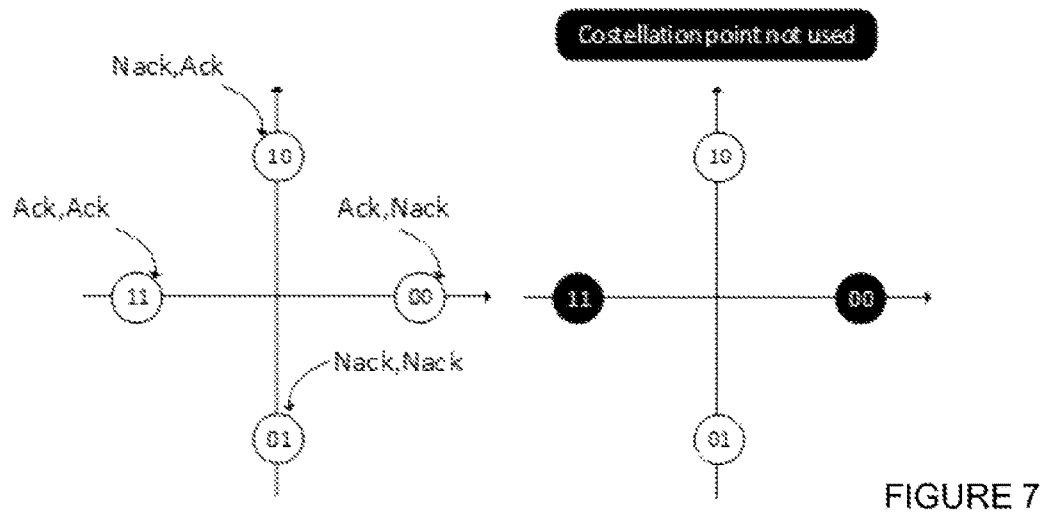
FIG. 7 illustrates an example modified full QPSK constellation with remapped ACK/NACK assignments and the example constellation experienced at a receiver, in accordance with certain embodiments.

In certain embodiments, the symbols of the constellation may remain unchanged, while addressing the problems described above. For example, according to certain embodiments, the mapping of Ack and Nack states may be re-defined to unskew the constellation, as viewed by the receiver. As a result, the same modulator may be implemented and only the selection of the transmitted constellation points may differ, as shown in FIG. 7. The swapping of the ACK/NACK states may result in the receiver receiving the 10 and 01 symbols and not receiving the 11 and 00 symbols (in contrast to the 00 and 01 and 11 and 10 symbols, respectively in FIG. 5). Because the positions of the 10 and 01 symbols are already balanced (unskewed), the constellation points may remain the same if the states indicated by the symbols are swapped.

In certain embodiments, the swapping of constellation points or the swapping of ACK/NACK states are applied for slot-SPUCCH. In some embodiments, the modified constellation is used only for slot-SPUCCH and the normal constellation is used for subframe PUCCH as previously defined.

FIG. 7 shows the performance difference between using the legacy receiver when only two states are used by the transmitter (skewed BPS K) and using the modified constellation or modified mapping of A/N state which results in the regular BPSK points. It can be seen that, with the modified constellation and, thus, a more proper DTX region, the Nack-to-ack error can be improved significantly, reducing the required SNR at which Nack-to-ack error rate$<10^{-3}$ and Ack error rate$<10^{-2}$ by roughly 2 dB.

Figure 8:
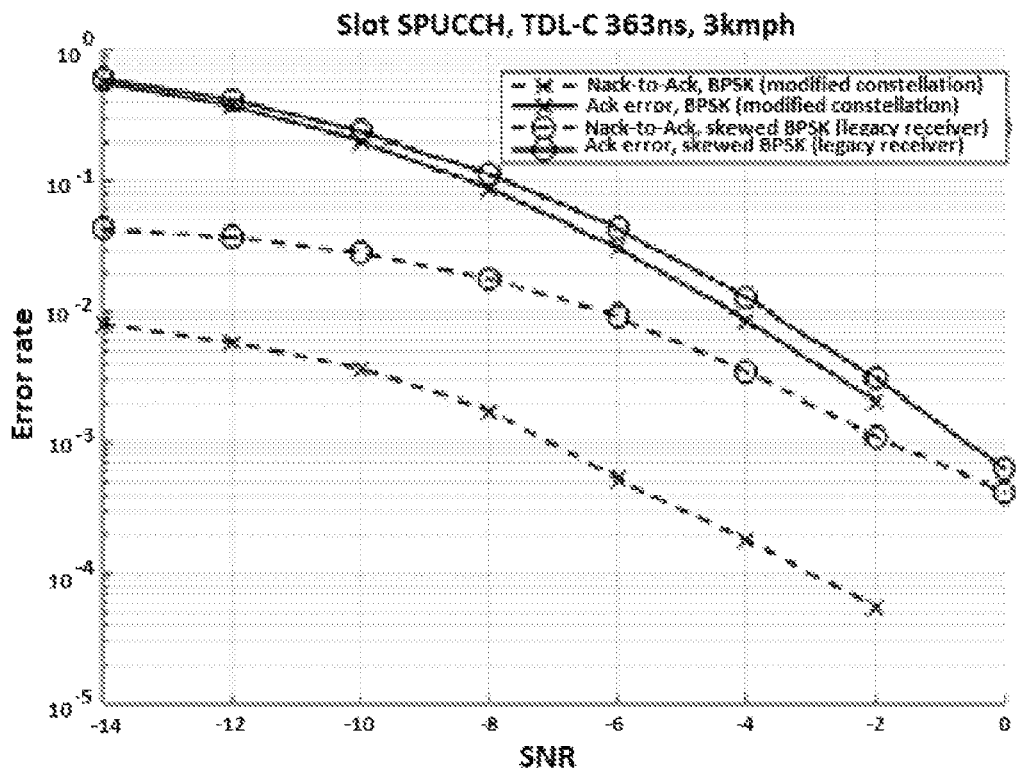
FIG. 8 illustrates a plot of the performance of slot sPUCCH based on BPSK and skewed BPSK constellations, in accordance with certain embodiments.
Figure 9:
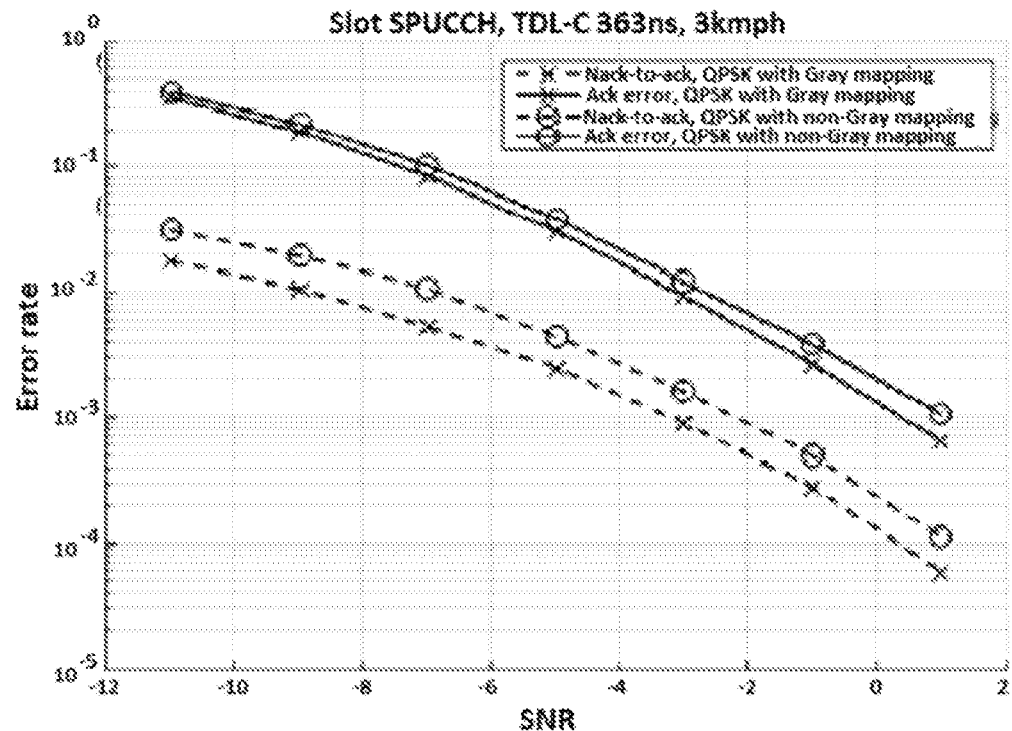
FIG. 9 illustrates a plot of the performance of slot sPUCCH based on QPSK with Gray and non-Gray mapping, in accordance with certain embodiments.

One potential drawback is that the QPSK constellation may no longer be Gray mapped (e.g., adjacent constellation points may have a change of two bit states, and not one), However, this has little impact as long as the full constellation is rarely experienced by the receiver. Yet, this typically will only happen when simultaneous subframe transmissions occur, which is considered a rare event, particularly for URLLC type services. The slight performance degradation of not using Gray mapping for the 2-bit HARQ case is shown in FIG. 8.

Figure 10:
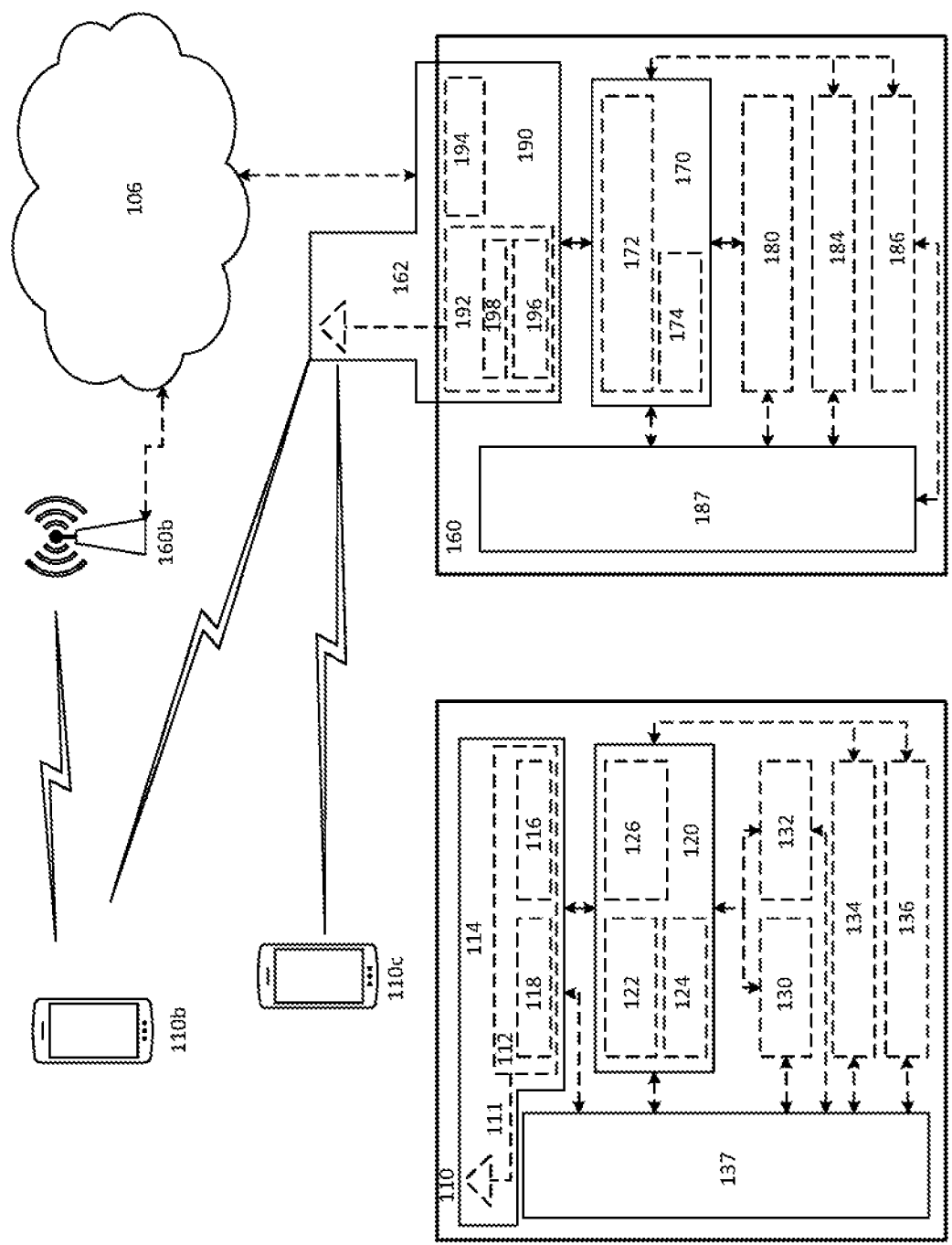
FIG. 10 illustrates an example wireless network, in accordance with certain embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 160 includes processing circuitry 170, device readable medium 180, interface 190, auxiliary equipment 184, power source 186, power circuitry 187, and antenna 162. Although network node 160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and an RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 10 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 11:
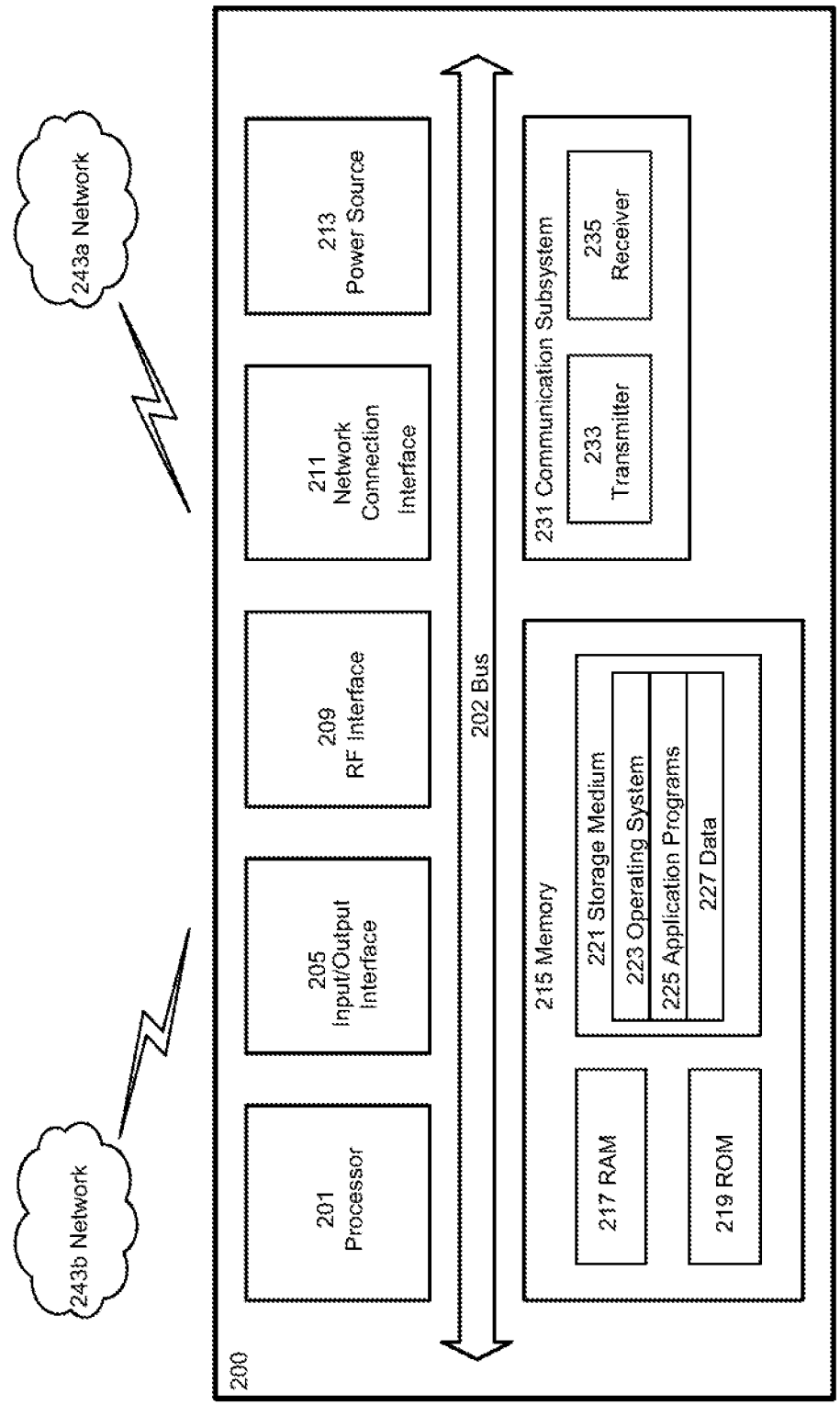
FIG. 11 illustrates an example user equipment, in accordance with certain embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 11, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 12:
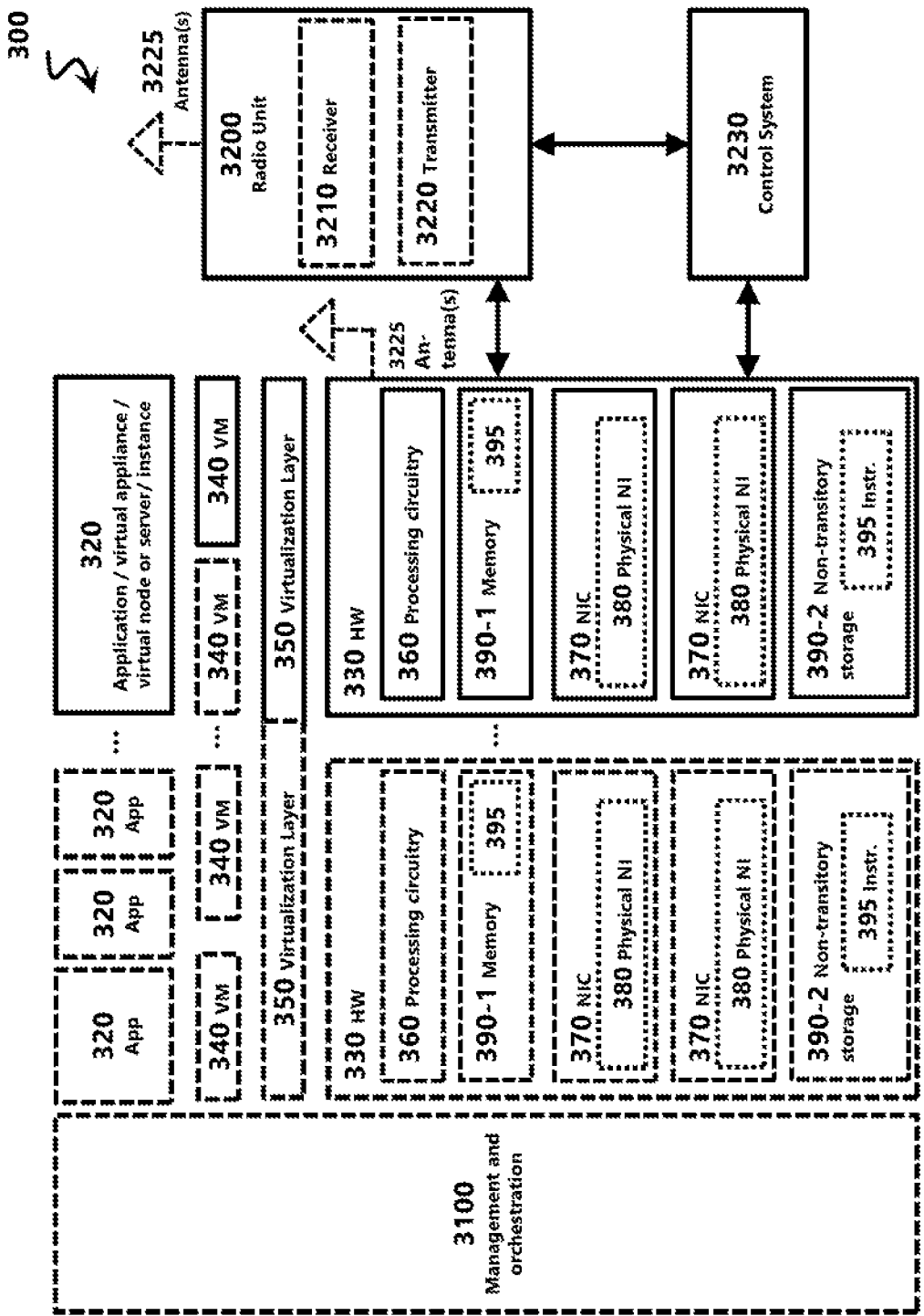
FIG. 12 illustrates an example virtualization environment, in accordance with certain embodiments.

FIG. 12 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 12, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 12.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be affected with the use of control system 3230 which may alternatively be used for communication between the hardware nodes 330 and radio units 3200.

Figure 13:
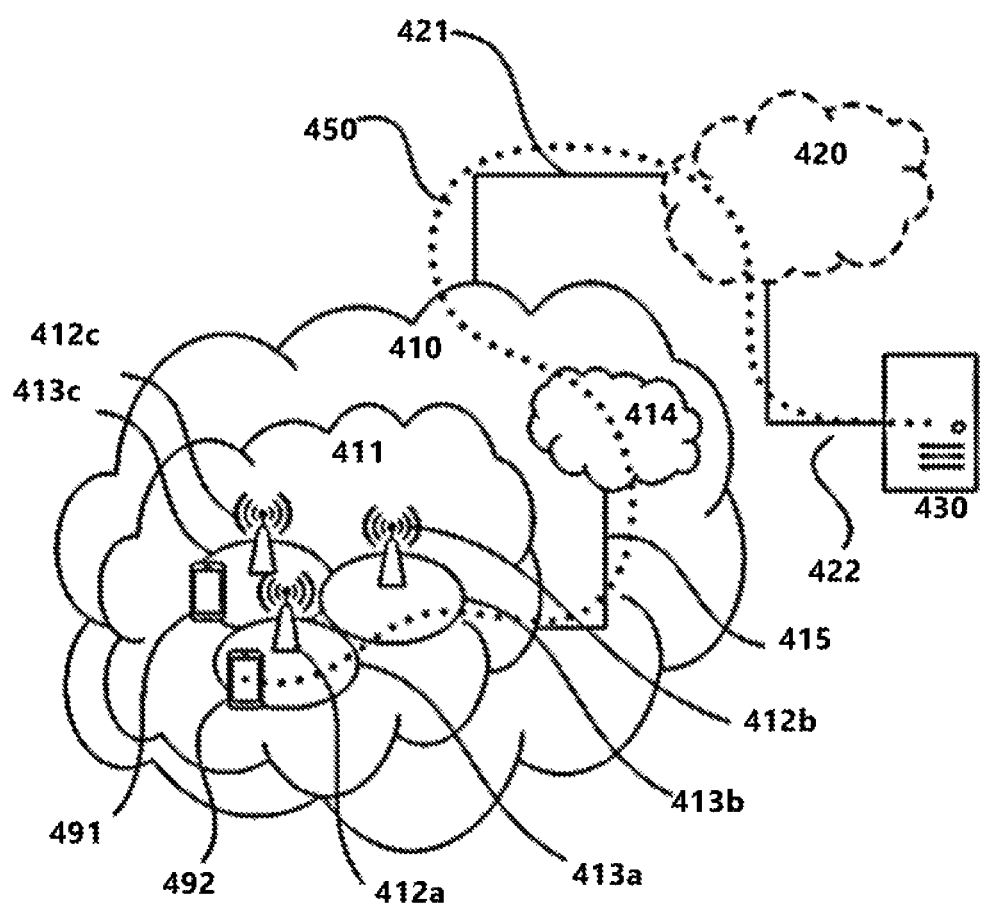
FIG. 13 illustrate an example telecommunication network connected via an intermediate network to a host computer, in accordance with certain embodiments.

With reference to FIG. 13, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 13 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 14:
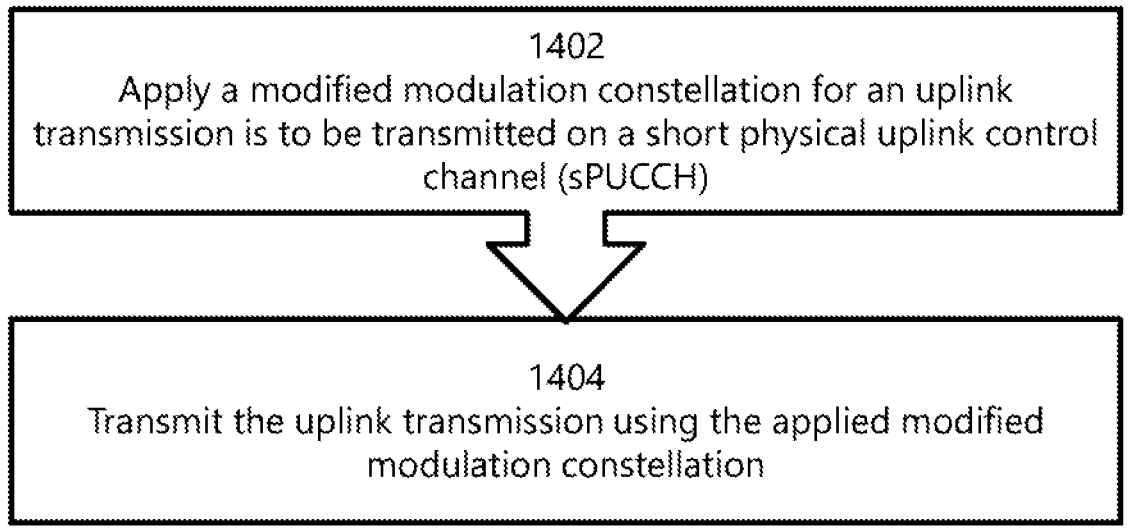
FIG. 14 illustrates an example method performed by a wireless device, in accordance with certain embodiments.

FIG. 14 depicts a method by a wireless device for improved Quadrature Phase-Shifting Keying (QPSK) reception when transmitting Hybrid Automatic Repeat Request (HARQ) feedback in accordance with particular embodiments. The method begins at step 1402 when the wireless device applies a modified modulation constellation for an uplink transmission is to be transmitted on a short physical uplink control channel (sPUCCH), applying. The modified modulation constellation has a modified Acknowledgment/Non-Acknowledgment (ACK/NACK) assignment as compared to a normal modulation constellation having a normal ACK/NACK assignment.

In a particular embodiment, the modified ACK/NACK assignment includes a plurality of constellation points, wherein a respective position of at least two constellation points of the modified modulation constellation are swapped as compared to a respective position of the same at least two constellation points in a normal modulation constellation used by the wireless device.

In another particular embodiment, the modified ACK/NACK assignment includes a plurality of constellation points, wherein a respective ACK/NACK state of at least two constellation points of the modified modulation constellation are swapped as compared to a respective ACK/NACK state of the same at least two constellation points a normal modulation constellation used by the wireless device.

At step 1404, the uplink transmission is transmitted using the applied modified modulation constellation.

Figure 15:
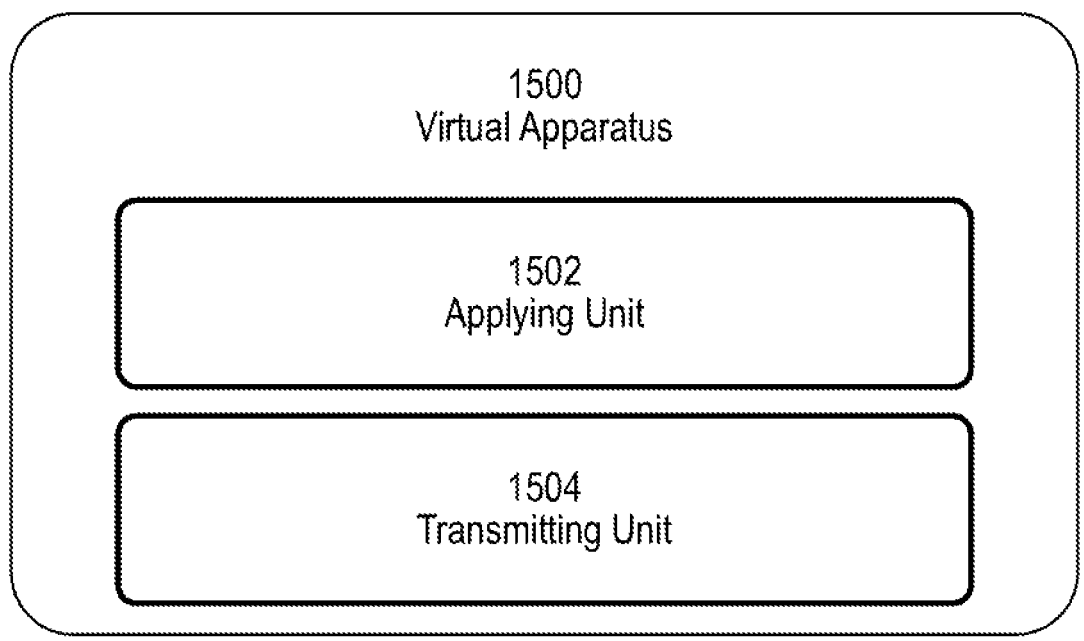
FIG. 15 illustrates a schematic block diagram of a first example apparatus in a wireless network, in accordance with certain embodiments.

FIG. 15 illustrates a schematic block diagram of an apparatus 1500 in a wireless network (for example, the wireless network shown in FIG. 10). The apparatus may be implemented in a wireless device or network node (e.g., wireless device 110 or network node 160 shown in FIG. 10). Apparatus 1500 is operable to carry out the example method described with reference to FIG. 14 and possibly any other processes or methods disclosed herein. It is also to be understood that the method of FIG. 14 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause applying unit 1502 and transmitting unit 1504, and any other suitable units of apparatus 1500 to perform corresponding functions according one or more embodiments of the present disclosure.

As illustrated in FIG. 15, apparatus 1500 includes applying unit 1502. and transmitting unit 1504. Applying unit 1500 is operable to perform certain applying functions. For example, in a particular embodiment, applying unit 1502 may be configured to apply a modified modulation constellation for an uplink transmission is to be transmitted on a short physical uplink control channel (sPUCCH), applying. The modified modulation constellation has a modified Acknowledgment/Non-Acknowledgment (ACK/NACK) assignment as compared to a normal modulation constellation having a normal ACK/NACK assignment.

The transmitting unit 1504 may be configured to perform certain transmitting functions. For example, in a particular embodiment, transmitting unit 1504 may be configured to transmit the uplink transmission using the applied modified modulation constellation.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 16:
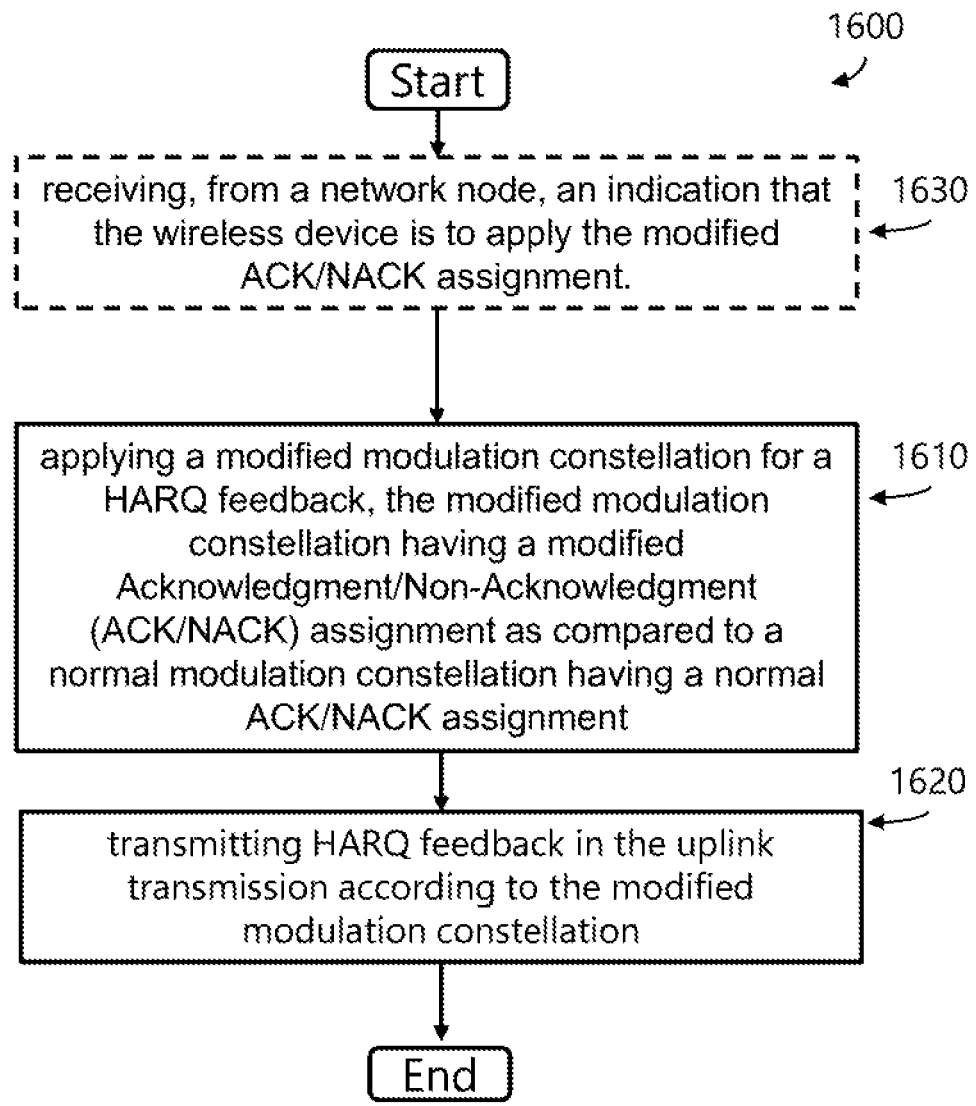
FIG. 16 illustrates a second example method performed by a wireless device, in accordance with certain embodiments.

FIG. 16 illustrates a second example method 1600 performed by a wireless device, such as one of wireless devices 110, 200, 330, 491, 492, in accordance with certain embodiments. Method 1600 may begin at step 1610, wherein a modified modulation constellation for a HARQ feedback is applied. The modified modulation constellation has a modified ACK/NACK assignment compared to a normal modulation constellation having a normal ACK/NACK assignment. For example, a normal modulation constellation for QPSK may have four equidistant constellation points that are positioned based on a Gray mapping, such that successive values only differ by a single bit. This may minimize the bit error rate of transmission using this normal constellation. The modulation constellation may carry more than one bit that encodes ACK/NACK feedback. For example, a QPSK constellation with four points may encode two bits of information, with each bit carrying an ACK/NACK identifier for a subslot and the subframe. In certain embodiments, some ACK/NACK feedback is not reported, e.g., to maintain latency or other service requirements. Accordingly, in some embodiments, the receiver of the constellation sees a skewed constellation. For example, if subframe ACK/NACK is not reported, one bit may always be "off" or "on," which if QPSK with Gray coding is used, may result in the received seeing the partial constellation, as illustrated in FIG. 5.

The modified modulation constellation may have a modified ACK/NACK assignment, which may prevent this "skewing" or imbalance of the constellation from the viewpoint of the receiver. For example, the two symbols may be swapped, or the assignments of the ACK/NACK feedback may be exchanged between symbols, as described above in reference to FIGS. 6 and 7. In particular, in some embodiments, applying the modified constellation includes swapping the respective position of at least two of the constellation points as compared to a respective position of the same at least two constellation points in the normal modulation constellation. In some embodiments, applying the modified constellation includes swapping a respective ACK/NACK state of at least two of the constellation points swapped as compared to a respective ACK/NACK state of the same at least two constellation points in the normal modulation constellation. In these manners, a modified modulation may be applied for a HARQ feedback.

At step 1620, HARQ feedback may be transmitted in the uplink transmission according to the modified modulation constellation. For example, the wireless device may determine to use apply and use the modified modulation constellation for one or more HARQ feedbacks, e.g., when the wireless device is indicated to do so or based on one or more other criteria indicating that a modified modulation constellation may benefit the network and/or transmission on the network. In this manner, the modified modulation constellation may be used to transmit HARQ feedback, which may improve the receivability and/or bit error rate In certain embodiment, method 1600 may include one or more additional steps. For example, method 1600 may further include step 1630, wherein an indication that the wireless device is to apply the modified ACK/NACK assignment is received from a network node. For example, a network node may receive previous ACK/NACK or other feedback from the wireless device and determine that constellation of the received information is skewed or is limited to a certain quadrant of the constellation. The network node may then indicate to the wireless device to apply the modified modulation constellation, such as in the manners described above. As another example, a network node may determine that the wireless device is operating in a certain mode, e.g., a low latency mode and/or not reporting subframe feedback. Based on this information, the network node may predict that receiving HARQ feedback using the normal modulation constellation would not be the most accurate. As a result, the network node may provide the indication to the wireless device to apply the modified modulation constellation. In some embodiments, the network node may also indicate a duration and/or number of feedbacks for which the modified constellation should be applied or may indicate one or more conditions under which the modified constellation should be applied instead of the normal modulation constellation.

Accordingly, method 1600 may enhance the transmission and reception of multi-bit HARQ feedback by applying a modified modulation constellation for HARQ feedback and transmitting the HARQ feedback in the uplink transmission according to the modified modulation constellation.

Figure 17:
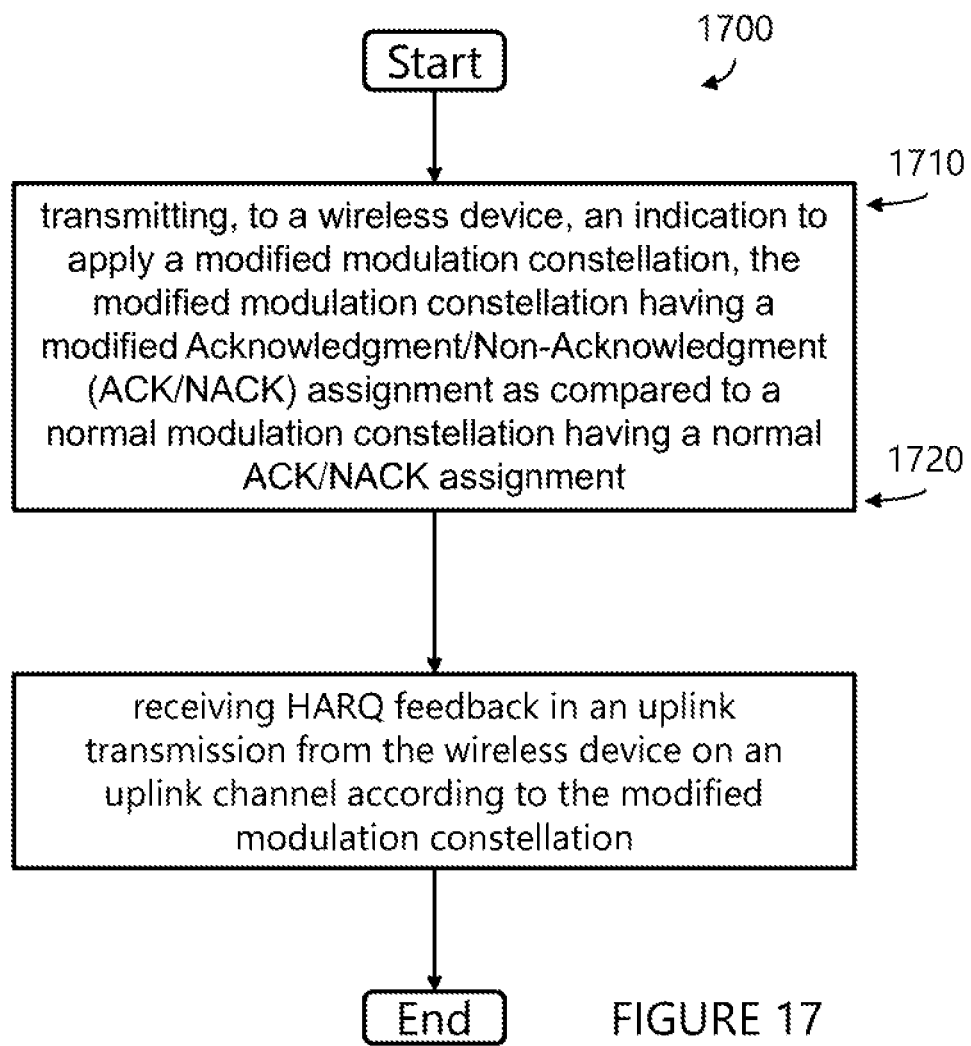
FIG. 17 illustrates an example method performed by a network node, in accordance with certain embodiments.

FIG. 17 illustrates an example method 1700 performed by a network node, such as network nodes 160, 330, 412, in accordance with certain embodiments. Method 1700 may begin at step 1710, wherein an indication to apply a modified modulation constellation is transmitted to a wireless device, such as one of wireless devices 110, 200, 330, 491, 492. For example, a network node may receive previous ACK/NACK or other feedback from the wireless device and determine that constellation of the received information is skewed or is limited to a certain quadrant of the constellation. The network node may then indicate to the wireless device to apply the modified modulation constellation, such as in the manners described above. As another example, a network node may determine that the wireless device is operating in a certain mode, e.g., a low latency mode and/or not reporting subframe feedback. Based on this information, the network node may predict that receiving HARQ feedback using the normal modulation constellation would not be the most accurate. As a result, the network node may provide the indication to the wireless device to apply the modified modulation constellation. In some embodiments, the network node may also indicate a duration and/or number of feedbacks for which the modified constellation should be applied or may indicate one or more conditions under which the modified constellation should be applied instead of the normal modulation constellation.

The modified modulation constellation may have a modified ACK/NACK assignment, as described above, which may provide a "received" constellation that is balanced or having constellation points that are equidistant. For example, the two symbols may be swapped, or the assignments of the ACK/NACK feedback may be exchanged between symbols, as described above in reference to FIGS. 6 and 7. In particular, in some embodiments, applying the modified constellation includes swapping the respective position of at least two of the constellation points as compared to a respective position of the same at least two constellation points in the normal modulation constellation. In some embodiments, applying the modified constellation includes swapping a respective ACK/NACK state of at least two of the constellation points swapped as compared to a respective ACK/NACK state of the same at least two constellation points in the normal modulation constellation. In these manners, a modified modulation may be applied for a HARQ feedback.

At step 1720, the network node may receive HARQ feedback in an uplink transmission from the wireless device on an uplink channel according to the modified modulation constellation. For example, the wireless device may apply the modified modulation constellation as indicated by the network node. The indication from the network node may indicate how the modulation constellation may be modified or the wireless device may determine in what manner it is modified. In some embodiments, the network node may receive HARQ feedback such that the "received" constellation is not skewed and/or has constellation points that are spaced equidistantly. For example, using the example of QPSK, the "received" constellation points may be modified from receiving the right and bottom points to receiving the top and bottom points or the left and right points. Accordingly, method 1700 may provide improved HARQ feedback in an uplink channel by indicating a wireless device to apply a modified modulation constellation and receiving HARQ feedback according to the modified modulation constellation.

In certain embodiments, methods 1600 and 1700 may contain additional, fewer, or different steps. Additionally, the methods described herein may be implemented on one or more components of network 106, such as network node 160 and wireless device 110 or any other components described herein using FIGS. 10-15. While certain components may have been used in describing certain steps of methods 1600 and 1700, any suitable components may be used to carry out one or more steps of the respective methods.

Sample Embodiments

1. A method performed by a wireless device for improved Quadrature Phase-Shifting Keying (QPSK) reception when transmitting Hybrid Automatic Repeat Request (HARQ) feedback, the method comprising:

for an uplink transmission is to be transmitted on a short physical uplink control channel (sPUCCH), applying a modified modulation constellation, the modified modulation constellation having a modified Acknowledgment/Non-Acknowledgment (ACK/NACK) assignment as compared to a normal modulation constellation having a normal ACK/NACK assignment; and transmitting the uplink transmission using the applied modified modulation constellation.

2. The method of embodiment 1, wherein:

the modified ACK/NACK assignment is associated with a modified modulation constellation comprising a plurality of constellation points, the normal ACK/NACK assignment is associated with a normal modulation constellation, and a respective position of at least two constellation points of the modified modulation constellation are swapped as compared to a respective position of the same at least two constellation points in the normal modulation constellation.

3. The method of embodiment 1, wherein:

the modified ACK/NACK assignment is associated with a modified modulation constellation comprising a plurality of constellation points, the normal ACK/NACK assignment is associated with a normal modulation constellation, and a respective ACK/NACK state of at least two constellation points of the modified modulation constellation are swapped as compared to a respective ACK/NACK state of the same at least two constellation points in the normal modulation constellation.

4. The method of any one of embodiments 1 to 3, further comprising configuring the wireless device to use the modified ACK/NACK assignment when transmitting HARQ feedback on a plurality of physical channels.

5. The method of any one of embodiments 1 to 3, further comprising configuring the wireless device to use the modified ACK/NACK assignment for uplink transmissions on slot-SPUCCH.

6. The method of any one of embodiments 1 to 5, further comprising receiving, from a network node, an indication identifying that the wireless device is to apply the modified ACK/NACK assignment.

7. The method of embodiment 64, wherein the indication is received via RRC signalling.

8. The method of any one of embodiments 1 to 7, further comprising:

determining an operation mode of the wireless device; and based on the operational mode, determining to apply the modified ACK/NACK assignment.

9. The method of embodiment 8, wherein, when in the operation mode, the wireless device is configured to use a small or compact DCI size 10. The method of embodiment 8, wherein, when in the operation mode, the wireless device is configured with a service having non equi-probable transmission of different state using the normal ACK/NACK assignment.

11. A computer program comprising instructions which when executed on a computer perform any of the methods of embodiments 1 to 10.

12. A computer program product comprising computer program, the computer program comprising instructions which when executed on a computer perform any of the methods of embodiments 1 to 10.

13. A non-transitory, computer-readable medium storing instructions which when executed by a computer perform any of the methods of embodiments 1 to 10.

14. The method of any of embodiments 1 to 10, further comprising:

providing user data; and forwarding the user data to a host computer via the transmission to the base station.

15. A method implemented in a communication system including a host computer, a base station and a user equipment (UE), the method comprising:

at the host computer, receiving user data transmitted to the base station from the UE, wherein the UE for an uplink transmission is to be transmitted on a short physical uplink control channel (sPUCCH), applies a modified modulation constellation, the modified modulation constellation having a modified Acknowledgment/Non-Acknowledgment (ACK/NACK) assignment as compared to a normal modulation constellation having a normal ACK/NACK assignment; and transmits the uplink transmission using the applied modified modulation constellation.

16. The method of embodiment 15, further comprising:
at the UE, providing the user data to the base station.

17. The method of embodiment 16, further comprising:
at the UE, executing a client application, thereby providing the user data to be transmitted; and
at the host computer, executing a host application associated with the client application.

18. The method of embodiment 16, further comprising:
at the UE, executing a client application; and
at the UE, receiving input data to the client application, the input data being provided at the host computer by executing a host application associated with the client application,
wherein the user data to be transmitted is provided by the client application in response to the input data.

19. A method performed by a wireless device for improved Quadrature Phase-Shifting Keying (QPSK) reception when transmitting Hybrid Automatic Repeat Request (HARQ) feedback, the method comprising:
for an uplink transmission is to be transmitted on a short physical uplink control channel (sPUCCH), applying a modified modulation constellation, the modified modulation constellation comprising a plurality of constellation points, wherein a respective position of at least two constellation points of the modified modulation constellation are swapped as compared to a respective position of the same at least two constellation points in a normal modulation constellation used by the wireless device; and
transmitting the uplink transmission using the applied modified modulation constellation.

20. The method of embodiment 19, further comprising configuring the wireless device to use the modified modulation constellation when transmitting HARQ feedback on a plurality of physical channels.

21. The method of embodiment 19, further comprising configuring the wireless device to use the modified modulation constellation for uplink transmissions on slot-SPUCCH.

22. The method of any one of embodiments 19 to 21, further comprising receiving, from a network node, an indication identifying that the wireless device is to apply the modified modulation constellation.

23. The method of embodiment 22, wherein the indication is received via RRC signalling.

24. The method of embodiment 19, further comprising:
determining an operation mode of the wireless device; and
based on the operational mode, determining to apply the modified modulation constellation.

25. The method of embodiment 24, wherein, when in the operation mode, the wireless device is configured to use a small or compact DCI size 26. The method of embodiment 24, wherein, when in the operation mode, the wireless device is configured with a service having non equi-probable transmission of different state using the normal modulation constellation.

27. A computer program comprising instructions which when executed on a computer perform any of the methods of embodiments 19 to 26.

28. A computer program product comprising computer program, the computer program comprising instructions which when executed on a computer perform any of the methods of embodiments 19 to 26.

29. A non-transitory, computer-readable medium storing instructions which when executed by a computer perform any of the methods of embodiments 19 to 26.

30. A method implemented in a communication system including a host computer, a base station and a user equipment (UE), the method comprising:
at the host computer, receiving user data transmitted to the base station from the UE, wherein the UE;
for an uplink transmission is to be transmitted on a short physical uplink control channel (sPUCCH), applies a modified modulation constellation, the modified modulation constellation comprising a plurality of constellation points, wherein a respective position of at least two constellation points of the modified modulation constellation are swapped as compared to a respective position of the same at least two constellation points in a normal modulation constellation used by the wireless device; and
transmits the uplink transmission using the applied modified modulation constellation.

31. The method of embodiment 30, further comprising:
at the UE, providing the user data to the base station.

32. The method of embodiment 31, further comprising:
at the UE, executing a client application, thereby providing the user data to be transmitted; and
at the host computer, executing a host application associated with the client application.

33. The method of embodiment 31, further comprising:
at the UE, executing a client application; and
at the UE, receiving input data to the client application, the input data being provided at the host computer by executing a host application associated with the client application,
wherein the user data to be transmitted is provided by the client application in response to the input data.

34. A method performed by a wireless device for improved Quadrature Phase-Shifting Keying (QPSK) reception when transmitting Hybrid Automatic Repeat Request (HARQ) feedback, the method comprising:
for an uplink transmission is to be transmitted on a short physical uplink control channel (sPUCCH), applying a modified modulation constellation, the modified modulation constellation comprising a plurality of constellation points, wherein a respective ACK/NACK state of at least two constellation points of the modified modulation constellation are swapped as compared to a respective ACK/NACK state of the same at least two constellation points a normal modulation constellation used by the wireless device; and
transmitting the uplink transmission using the applied modified modulation constellation.

35. The method of embodiment 34, further comprising configuring the wireless device to use the modified modulation constellation when transmitting HARQ feedback on a plurality of physical channels.

36. The method of embodiment 34, further comprising configuring the wireless device to use the modified modulation constellation for uplink transmissions on slot-SPUCCH.

37. The method of any one of embodiments 34 to 36, further comprising receiving, from a network node, an indication identifying that the wireless device is to apply the modified modulation constellation.

38. The method of embodiment 37, wherein the indication is received via RRC signalling.

39. The method of embodiment 34, further comprising:
determining an operation mode of the wireless device; and
based on the operational mode, determining to apply the modified modulation constellation.

40. The method of embodiment 39, wherein, when in the operation mode, the wireless device is configured to use a small or compact DCI size.

41. The method of embodiment 39, wherein, when in the operation mode, the wireless device is configured with a service having non equi-probable transmission of different state using the normal modulation constellation.

42. A computer program comprising instructions which when executed on a computer perform any of the methods of embodiments 34 to 41.

43. A computer program product comprising computer program, the computer program comprising instructions which when executed on a computer perform any of the methods of embodiments 34 to 41.

44. A non-transitory computer readable medium storing instructions which when executed by a computer perform any of the methods of embodiments 34 to 41.

45. A method implemented in a communication system including a host computer, a base station and a user equipment (UE), the method comprising:

at the host computer, receiving user data transmitted to the base station from the UE, wherein the UE;

for an uplink transmission is to be transmitted on a short physical uplink control channel (sPUCCH), applies a modified modulation constellation, the modified modulation constellation comprising a plurality of constellation points, wherein a respective ACK/NACK state of at least two constellation points of the modified modulation constellation are swapped as compared to a respective ACK/NACK state of the same at least two constellation points a normal modulation constellation used by the wireless device; and transmits the uplink transmission using the applied modified modulation constellation.

46. The method of embodiment 45, further comprising:
at the UE, providing the user data to the base station.

47. The method of embodiment 46, further comprising:
at the UE, executing a client application, thereby providing the user data to be transmitted; and
at the host computer, executing a host application associated with the client application.

48. The method of embodiment 46, further comprising:
at the UE, executing a client application; and
at the UE, receiving input data to the client application, the input data being provided at the host computer by executing a host application associated with the client application,
wherein the user data to be transmitted is provided by the client application in response to the input data.

49. A method performed by a network node for improved Quadrature Phase-Shifting Keying (QPSK) reception when receiving Hybrid Automatic Repeat Request (HARQ) feedback, the method comprising:

transmitting, to a wireless device, an indication to apply a modified modulation constellation, the modified modulation constellation having a modified Acknowledgment/Non-Acknowledgment (ACK/NACK) assignment as compared to a normal modulation constellation having a normal ACK/NACK assignment; and receiving the uplink transmission using the applied ACK/NACK assignment.

50. The method of embodiment 49, wherein:
the modified ACK/NACK assignment is associated with a modified modulation constellation comprising a plurality of constellation points,
the normal ACK/NACK assignment is associated with a normal modulation constellation, and a respective position of at least two constellation points of the modified modulation constellation are swapped as compared to a respective position of the same at least two constellation points in the normal modulation constellation.

51. The method of embodiment 49, wherein:
the modified ACK/NACK assignment is associated with a modified modulation constellation comprising a plurality of constellation points,
the normal ACK/NACK assignment is associated with a normal modulation constellation, and
a respective ACK/NACK state of at least two constellation points of the modified modulation constellation are swapped as compared to a respective ACK/NACK state of the same at least two constellation points in the normal modulation constellation.

52. The method of any one of embodiments 49 to 51, further comprising configuring the wireless device to use the modified ACK/NACK assignment when transmitting HARQ feedback on a plurality of physical channels.

53. The method of any one of embodiments 49 to 51, further comprising configuring the wireless device to use the modified ACK/NACK assignment for uplink transmissions on slot-SPUCCH.

54. The method of any of embodiments 49 to 53, wherein the indication is transmitted via RRC signalling.

55. The method of any one of embodiments 49 to 54, further comprising:
determining an operation mode of the wireless device; and
based on the operational mode, transmitting the indication to apply the modified ACK/NACK assignment.

56. The method of embodiment 55, wherein, when in the operation mode, the wireless device is configured to use a small or compact DCI size.

57. The method of embodiment 55, wherein, when in the operation mode, the wireless device is configured with a service having non equi-probable transmission of different state using the normal ACK/NACK assignment.

58. A computer program comprising instructions which when executed on a computer perform any of the methods of embodiments 49 to 58.

59. A computer program product comprising computer program, the computer program comprising instructions which when executed on a computer perform any of the methods of embodiments 49 to 58.

60. A non-transitory computer readable medium storing instructions which when executed by a computer perform any of the methods of embodiments 49 to 58.

61. A method implemented in a communication system including a host computer, a base station and a user equipment (UE), the method comprising:

at the host computer, receiving, from the base station, user data originating from a transmission which the base station has received from the UE, wherein the base station transmit, to the UE, an indication to apply a modified modulation constellation, the modified modulation constellation having a modified Acknowledgment/Non-Acknowledgment (ACK/NACK) assignment as compared to a normal modulation constellation having a normal ACK/NACK assignment; and receive the uplink transmission using the applied ACK/NACK assignment.

62. The method of embodiment 61, further comprising:
at the base station, receiving the user data from the UE.

63. The method of embodiment 62, further comprising:
at the base station, initiating a transmission of the received user data to the host computer.

64. A method performed by a network node for improved Quadrature Phase-Shifting Keying (QPSK) reception when receiving Hybrid Automatic Repeat Request (HARQ) feedback, the method comprising:

transmitting, to a wireless device, an indication to apply a modified modulation constellation for an uplink transmission on a short physical uplink control channel (sPUCCH), the modified modulation constellation comprising a plurality of constellation points, wherein a respective position of at least two constellation points of the modified modulation constellation are swapped as compared to a respective position of the same at least two constellation points in a normal modulation constellation used by the wireless device; and receiving the uplink transmission using the applied modified modulation constellation.

65. A method performed by a network node for improved Quadrature Phase-Shifting Keying (QPSK) reception when receiving Hybrid Automatic Repeat Request (HARQ) feedback, the method comprising:

transmitting, to a wireless device, an indication to apply a modified modulation constellation for an uplink transmission on a short physical uplink control channel (sPUCCH), the modified modulation constellation comprising a plurality of constellation points, wherein a respective ACK/NACK state of at least two constellation points of the modified modulation constellation are swapped as compared to a respective ACK/NACK state of the same at least two constellation points a normal modulation constellation used by the wireless device; and receiving the uplink transmission using the applied modified modulation constellation.

66. A wireless device for improved Quadrature Phase-Shifting Keying (QPSK) reception when transmitting Hybrid Automatic Repeat Request (HARQ) feedback, the wireless device comprising processing circuitry configured to perform any of the steps of embodiments 1 to 10.

67. A communication system including a host computer comprising:

a communication interface configured to receive user data originating from a transmission from a user equipment (UE) to a base station, wherein the UE comprises a radio interface and processing circuitry, the UE's processing circuitry configured to:

for an uplink transmission is to be transmitted on a short physical uplink control channel (sPUCCH), apply a modified modulation constellation, the modified modulation constellation having a modified Acknowledgment/Non-Acknowledgment (ACK/NACK) assignment as compared to a normal modulation constellation having a normal ACK/NACK assignment; and transmit the uplink transmission using the applied modified modulation constellation.

68. The communication system of embodiment 67, further including the UE.

69. The communication system of embodiment 68, further including the base station, wherein the base station comprises a radio interface configured to communicate with the UE and a communication interface configured to forward to the host computer the user data carried by a transmission from the UE to the base station.

70. The communication system of embodiments 68 or 69, wherein:

the processing circuitry of the host computer is configured to execute a host application; and the UE's processing circuitry is configured to execute a client application associated with the host application, thereby providing the user data.

71. The communication system of embodiments 68 or 69, wherein:

the processing circuitry of the host computer is configured to execute a host application, thereby providing request data; and the UE's processing circuitry is configured to execute a client application associated with the host application, thereby providing the user data in response to the request data.

72. A network node for improved Quadrature Phase-Shifting Keying (QPSK) reception when receiving Hybrid Automatic Repeat Request (HARQ) feedback, the wireless device comprising processing circuitry configured to perform any of the steps of embodiments 49 to 57.

73. A communication system including a host computer comprising a communication interface configured to receive user data originating from a transmission from a user equipment (UE) to a base station, wherein the base station comprises a radio interface and processing circuitry, the base station's processing circuitry configured to transmit, to the IE, an indication to apply a modified modulation constellation, the modified modulation constellation having a modified Acknowledgment/Non-Acknowledgment (ACK/NACK) assignment as compared to a normal modulation constellation having a normal ACK/NACK assignment; and receive the uplink transmission using the applied ACK/NACK assignment.

74 The communication system of embodiment 73, further including the base station.

75. The communication system of embodiment 74, further including the UE, wherein the UE is configured to communicate with the base station.

76. The communication system of embodiment 75, wherein:

the processing circuitry of the host computer is configured to execute a host application;

the UE is configured to execute a client application associated with the host application, thereby providing the user data to be received by the host computer.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A method performed by a wireless device for transmitting Hybrid Automatic Repeat Request (HARQ) feedback, the method comprising:

receiving, from a network node, an indication that the wireless device is to apply the modified ACK/NACK assignment, and wherein the indication is received via radio resource control (RRC) signaling;

for an uplink transmission to be transmitted on an uplink channel, applying a modified modulation constellation for a HARQ feedback, the modified modulation constellation having a modified Acknowledgment/Non-Acknowledgment (ACK/NACK) assignment as compared to a normal modulation constellation having a normal ACK/NACK assignment; and transmitting HARQ feedback in the uplink transmission according to the modified modulation constellation.

2. The method of claim 1, wherein:
the normal modulation constellation comprises a plurality of constellation points and the modified modulation constellation comprises the plurality of constellation points having a respective position of at least two of the constellation points swapped as compared to a respective position of the same at least two constellation points in the normal modulation constellation.

3. The method of claim 1, wherein:
the normal modulation constellation comprises a plurality of constellation points and the modified modulation constellation comprises the plurality of constellation points having a respective ACK/NACK state of at least two of the constellation points swapped as compared to a respective AKC/NACK state of the same at least two constellation points in the normal modulation constellation.

4. The method of claim 1, further comprising configuring the wireless device to use the modified ACK/NACK assignment when transmitting HARQ feedbacks in uplink transmissions on a plurality of physical channels.

5. The method of claim 1, further comprising configuring the wireless device to use the modified ACK/NACK assignment when transmitting HARQ feedbacks in for uplink transmissions on slot-based short physical uplink control channel (sPUCCH).

6. The method of claim 1, further comprising determining to apply the modified ACK/NACK assignment if the wireless device is configured to use a small or compact downlink control information (DCI) size.

7. The method of claim 1, further comprising determining to apply the modified ACK/NACK assignment if the wireless device is configured with a service having non-equiprobable transmission of different state using the normal ACK/NACK assignment.

8. The method of claim 1, wherein the uplink channel is a short physical uplink control channel (sPUCCH).

9. A method performed by a network node for receiving Hybrid Automatic Repeat Request (HARQ) feedback, the method comprising:
transmitting, to a wireless device, an indication to apply a modified modulation constellation, the modified modulation constellation having a modified Acknowledgment/Non-Acknowledgment (ACK/NACK) assignment as compared to a normal modulation constellation having a normal ACK/NACK assignment; and
receiving HARQ feedback in an uplink transmission from the wireless device on an uplink channel according to the modified modulation constellation.

10. The method of claim 9, wherein:
the normal modulation constellation comprises a plurality of constellation points and the modified modulation constellation comprises the plurality of constellation points having a respective position of at least two of the constellation points swapped as compared to a respective position of the same at least two constellation points in the normal modulation constellation.

11. The method of claim 9, wherein:
the normal modulation constellation comprises a plurality of constellation points and the modified modulation constellation comprises the plurality of constellation points having a respective ACK/NACK state of at least two of the constellation points swapped as compared to a respective ACK/NACK state of the same at least two constellation points in the normal modulation constellation.

12. The method of claim 9, further comprising configuring the wireless device to use the modified ACK/NACK assignment when transmitting HARQ feedbacks in uplink transmissions on a plurality of physical channels.

13. The method of claim 9, further comprising configuring the wireless device to use the modified ACK/NACK assignment when transmitting HARQ feedbacks in for uplink transmissions on slot-based short physical uplink control channel (sPUCCH).

14. The method of claim 9, wherein the indication is transmitted via RRC signaling.

15. The method of claim 9, further comprising transmitting the indication to apply the modified ACK/NACK assignment if the wireless device is configured to use a small or compact downlink control information (DCI) size.

16. The method of claim 9, further comprising transmitting the indication to apply the modified ACK/NACK assignment if the wireless device is configured with a service having non-equiprobable transmission of different state using the normal ACK/NACK assignment.

17. The method of claim 9, wherein the uplink channel is a short physical uplink control channel (sPUCCH).

18. A wireless device comprising:
a memory configured to store instructions; and
processing circuitry configured to execute the instructions; wherein the wireless device is configured to:
receive, from a network node, an indication that the wireless device is to apply the modified ACK/NACK assignment, and wherein the indication is received via radio resource control (RRC) signaling;
for an uplink transmission to be transmitted on an uplink channel, apply a modified modulation constellation for a Hybrid Automatic Repeat Request (HARQ) feedback, the modified modulation constellation having a modified Acknowledgment/Non-Acknowledgment (ACK/NACK) assignment as compared to a normal modulation constellation having a normal ACK/NACK assignment; and
transmit HARQ feedback in the uplink transmission according to the modified modulation constellation.

19. A network node comprising:
a memory configured to store instructions; and
processing circuitry configured to execute the instructions; wherein the network node is configured to:
transmit, to a wireless device, an indication to apply a modified modulation constellation, the modified modulation constellation having a modified Acknowledgment/Non-Acknowledgment (ACK/NACK) assignment as compared to a normal modulation constellation having a normal ACK/NACK assignment; and
receive Hybrid Automatic Repeat Request (HARQ) feedback in an uplink transmission from the wireless device on an uplink channel according to the modified modulation constellation.

* * * * *